Patented Jan. 12, 1954

2,666,049

UNITED STATES PATENT OFFICE 2,666,049

METHOD OF MANUFACTURING PROTEIN

Stewart Rowe, Cincinnati, Ohio, assignor, by mesne assignments, to The Buckeye Cotton Oil Company, Memphis, Tenn., a corporation of Ohio No Drawing. Application September 19, 1951, Serial No. 247,386

6 Claims. (Cl. 260—123.5)

This invention relates to the production of vegetable protein from protein-containing seed materials. More particularly, the invention relates to the production of vegetable protein derived from soybean meal and having improved properties for paper coating applications.

Extraction of proteins from protein-containing seed material by means of aqueous solutions of alkaline agents such as borax, soda ash, trisodium phosphate, sodium hydroxide and ammonium hydroxide is well known. Depending upon the conditons, i. e. pH of the extracting medium, length of time the protein-containing material is in contact with the extracting medium and temperature at which the extraction is carried out, the extraction may or may not involve alkaline hydrolysis of the protein. For example, at a temperature of about 110° F. and a contact time of about 1 hour between the extracting medium and the protein-containing seed material, extraction at a pH of about 11 or higher will cause extensive hydrolysis to take place, while at a pH of about 9 or 10, little or no hydrolysis occurs. However, if the extraction is carried out at about 10 pH, substantial increase in the length of time which the protein-containing material is in contact with the extraction medium, or an increase in the temperature at which the extraction is being carried out will tend to promote a hydrolysis reaction.

In none of the known processes, however, is the final product entirely suitable for use in all of the various fields in which protein is employed, and particularly in the field of paper coating. Thus, if the extraction involves alkaline hydrolysis, and yet the treatment is relatively mild, e. g. about 11 pH at 100–110° F. for about two hours, the resulting dried protein may be redissolved in weakly alkaline solutions to form a strong adhesive, but it is too viscous for many purposes and when employed for paper coating will not spread properly. If this treatment is more intense or severe, either by reason of increase in (1) temperature, (2) the strength of the alkali or (3) the duration of treatment, the viscosity may be improved but the adhesive strength is usually impaired and the yield is not as great. On the other hand, proteins produced without alkaline hydrolysis, although having the desired low viscosity for paper coating applications, have not exhibited the adhesive strength when dissolved in mild alkali (i. e. alkali having a pH of between 8 and 10) which is characteristic of commercial alkali-hydrolyzed proteins. Consequently, low viscosity proteins heretofore produced in the absence of alkaline hydrolysis are not as desirable for many uses, and particularly where adhesive strength is needed, as are the alkali-hydrolyzed proteins.

U. S. Patent 2,431,993 shows graphically the course of alkaline hydrolysis of soybean protein. A low viscosity protein, such as is desired for paper coating, must have been so treated as to have undergone substantially no hydrolysis (which would place it at the left side of the curve shown in that patent), or have been hydrolyzed through a high-viscosity stage to a low final viscosity (which would place it at the right hand side of the curve shown in that patent). The proteins produced by my invention are called "unhydrolyzed" because they are at or near their initial low viscosity, without ever having been through the high-viscosity stage which must be traversed before reaching the low viscosity hydrolyzed product of most commercial proteins.

Proteins which are "hydrolyzed" have been treated with reagents (for example, acid or alkali) which effect, according to the best current belief, first an unfolding of the substantially globular native protein molecule into an extended chain configuration of difficult solubility and high solution viscosity, and then a partial depolymerization by hydrolysis of sensitive bonds in the main molecular chain which breaks the molecule down into shorter fragments and results in lowered solution viscosity and improved solubility. "Unhydrolyzed" proteins in contrast are substantially in the native globular state and have not undergone this unfolding and depolymerization of the protein molecule.

An "unhydrolyzed" protein may be distinguished from a "hydrolyzed" protein by its greater sensitivity to heat and alkali. Concentrated solutions of unhydrolyzed protein gel quite easily upon heating or upon the addition of sufficient alkali to initiate the unfolding-depolymerization process described above.

In extracting protein from vegetable materials such as soybeans under conditions which would result in the production of the substantially unhydrolyzed type of protein, great emphasis has been placed on working at low temperatures (in the vicinity of 100° F.). The use of higher temperatures during the process (125° F. or above) has heretofore resulted in difficult solubility of the protein in weakly alkaline solutions and high viscosity protein solutions, and prior to my invention, the production of a substantially unhydrolyzed, low-viscosity protein depended upon keeping the temperature low throughout the process. However, with low temperatures it was found that the extraction solution had to have a relatively high pH (about 9 to 11) in order to get an economical yield of protein from soybean flakes. This latter treatment resulted in a protein solution of the desired low viscosity but of quite poor adhesive strength.

A conventional method for producing a substantially unhydrolyzed soybean protein is described for example in Example I of U. S. 2,451,659 to Calvert.

It is an object of the present invention to produce a substantially unhydrolyzed soybean protein which has adhesive strength greately superior to that of unhydrolyzed soybean protein produced by previously known processes.

It is a further object to produce such protein in good yield and with color and viscosity characteristics satisfactory for paper coating applications.

Other objects and advantages will be apparent from the following description.

I have found that a substantially unhydrolyzed soybean protein, having the low solution viscosity desirable for paper coating applications and having greatly improved adhesive strength over that produced by prior processes not involving hydrolysis of the protein, such as the one hereinbefore referred to, can be produced in good yield by subjecting the protein in dispersion in an aqueous solution of an alkali metal sulfite or an alkaline earth metal sulfite to temperatures considerably higher than those customarily employed in processes for protein extraction and then cooling the said solution before precipitating the protein therefrom. Thus, the protein may be extracted from the soybean flakes with a solution of an alkali metal sulfite or an alkaline earth metal sulfite at temperatures considerably higher than those customarily used for extracting a substantially unhydrolyzed protein. Alternatively, the extraction may be carried out with the same extraction agents at temperatures customarily employed in the industry for extracting a substantially unhydrolyzed protein and the extract may then be heated to temperatures considerably in excess of such extraction temperatures. Following the high temperature treatment, which may take place, as hereinbefore stated, either during or subsequent to the extraction, the extract is cooled and the protein in solution is precipitated. Failure to cool the extract prior to precipitation of the protein therefrom results in high viscosity and incomplete solubility on resolution in mild alkali with consequent decreased adhesive strength.

Although the protein is customarily precipitated by the addition of an acid, it is to be understood that the present invention is not to be limited thereto and that other methods may be used to precipitate the protein such as, dialysis and salting out.

This combination of extracting with a sulfite of the type hereinbefore described, heat treating of the protein while in dispersion, and cooling of the dispersion before precipitating the protein therefrom, has been found to yield a protein which is substantially unhydrolyzed and which has the desirable properties and advantages before noted as regards adhesive strength and viscosity characteristics and, in addition, exhibits an improved wettability. (Wettability is defined as the ease with which the dry ground protein can be wet, expressed in units of time.)

Although solutions of sulfites have been previously used in extracting protein from protein-containing seed materials (e. g. U. S. 2,132,434), such prior procedures have never included a heat treating step with subsequent cooling of the protein-containing extract before precipitation of the protein therefrom. In fact, prior extractions with sulfite solutions have been, to the best of my knowledge, always carried out at relatively low temperatures, i. e. under 120° F.

According to the process of my invention, substantially oil-free soybean flakes are slurried with water in which an alkali metal sulfite or alkaline earth metal sulfite has been dissolved. In preferred practice, the water is first heated to the desired temperature, i. e. in the range from about 150° F. to 180° F., and an alkali metal sulfite or alkaline earth metal sulfite is dissolved in the water. (If desired, however, the sulfite may be dissolved in the water in the cold and the resulting solution may then be heated to the desired temperature.) The soybean flakes from which the protein is to be extracted are then added to the hot sulfite solution, the resultant slurry is then stirred (e. g. from about 5 to about 30 minutes), the temperature of the slurry being maintained throughout this time at a temperature chosen from within the specified range, and then screened. The wet solids are reslurried with more water at the desired temperature, stirred for about five minutes and then screened again. The liquid extracts from the two screening operations are then combined and cooled to less than 120° F. and preferably to about 110° F. or lower, that is, to any temperature above the freezing point of the extract. An acid is added to this cooled extract to precipitate the protein by adjusting the pH to the isoelectric range, which for soybean protein may be from about 4.0 to 4.7, with optimum results obtained at about 4.4 to 4.6. The precipitated protein is then concentrated, washed and dewatered according to the usual practice in the art.

It is to be understood that the re-extraction of the flakes is solely to improve the yield by dilution of the extract which is left in the residual meal, and is not essential to the invention. It may be omitted, or the extraction may be made in other ways, as for example by counter-current extraction, or by continuous extraction, or by use of a much larger amount of water, in order to avoid leaving concentrated solution of protein in the meal after separation of the extract.

When the alternative process of my invention is employed, essentially the same steps outlined above are employed with the following exceptions: the extraction is carried out at temperatures customarily used in the art, i. e. about 90 to 110° F., the extract is then heated to a temperature in the range from about 150° F. to about 212° F., cooled by any suitable means and precipitated in like manner as set forth above. The advantages of the present invention may be realized if the extract is quickly heated and then quickly cooled (see Example 10) or if the heated extract is held at the elevated temperature for up to about one hour before cooling.

Sulfuric acid is the precipitating agent customarily used in the art and may be used in my process. I prefer, however, to substitute, for the sulfuric acid, sulfur dioxide or a mixture of sulfur dioxide and sulfuric acid, since through the use of such agents a protein which yields solutions of lower viscosity on re-solution is obtained, and the viscosity of paper coating colors made from such redissolved protein may be desirably lowered. The acid addition may proceed either batchwise or continuously, and when sulfur dioxide is used, it may be added either as a gas or in solution.

The alkali metal sulfite or alkaline earth metal sulfite is added to the extraction water in an amount from about 0.5% to about 2.0% by weight of the flakes to be extracted. Smaller amounts (as low as 0.25%) are effective but the yield of protein tends to be lowered and solution viscosities of the isolated protein tend to be higher. Also, amounts greater than 2% by weight may be used but no gain in the yield or quality of the protein is evident and therefore the increased cost resulting from the use of a greater amount of sulfite is not justified. The sulfite addition affects the extraction pH only slightly and a normal pH range for sulfite extraction is from about 6.6 to 7.0.

The following examples are given by way of illustration and are not to be considered as limiting the process to the specific conditions set forth.

*Example 1.*—Three extractions were made at a pH of approximately 6.7 for comparison purposes in the following manner except that the temperature at which the extraction was carried out was varied as specified in Table I.

Sodium sulfite, 0.01 part by weight, was dissolved in 14 parts of water. This sulfite solution was then heated to the desired temperature and one part by weight of substantially oil-free soybean flakes was added thereto. The resulting slurry was agitated by a paddle at about 150 R. P. M. for about 30 minutes, the temperature being held within five degrees of the desired temperature and then screened through a 100 mesh screen. The wet solids were then reslurried with about 0.9 times their weight of water at the temperature at which the initial extraction was performed, agitated for 10 to 15 minutes more, and also screened through a 100 mesh screen. The extracts from both extractions were combined and passed through a 200 mesh screen, the temperature of the extracts being reduced during these operations to about 110° F. The protein was precipitated from the extract by the addition of sulfur dioxide, to a pH of about 4.4 and the precipitated protein curd was settled, washed, filtered, and dried. If desired, a centrifugal separation may be used in lieu of or in addition to the screening operations in the above process.

The protein produced by the above process was redissolved in a solution containing 3.5% caustic alkali and 10% of a 28% amomnia solution, based on the weight of the protein to be redissolved, to make a 15% solution of protein. This was added to a clay slip of such concentration that the final mixture contained 40% total solids and 15% protein based on the weight of the clay. After thorough mixing the resulting "coating color" was screened through a 100 mesh screen. The viscosity of the color was measured by the Brookfield viscometer at 60 R. P. M.

The viscosity of the solution of redispersed protein will vary widely depending upon what it is to be used for and in the case of coating colors the viscosity will vary with the percentage of solids in the coating color. With the normal 40% solids coating color, and employing conventional coating equipment viscosities lower than 500 centipoises are desirable.

This prepared coating color was coated on raw paper stock made for the grade known in the trade as "#2 Enamel," applying about 15 pounds of coating per ream per side. Since the two sides of such paper behave differently when coated, coatings were made on both sides: the "wire" side, i. e., the side which was supported by the Fourdrinier wire in the paper machine and the "felt" side, which is so designated because in manufacture of the paper sheet it comes into contact with a felt blanket which presses out moisture.

The coated paper was tested by the use of standard paper testing waxes which may be purchased on the open market. The complete series consists of 20 waxes which have graded adhesive powers. They run from 2A which has the least adhesive strength to 32A which has the greatest adhesive strength. The method T459m-45, Wax Test for Surface Strength of Paper, of the Technical Association of the Pulp and Paper Industry was employed. Thus, the waxes are softened in a flame, placed upon the coated paper, cooled, and then pulled off sharply. Each wax bears a number, and the strength of the coating is designated by the highest numbered wax which fails to remove any coating. In the test for example, with a given numbered wax (viz. 5A), the adhesive strength of the paper coating would be indicated as follows in increasing order.

cp5A—coating under the wax completely picked
.9p5A
.8p5A
↑
| —the approximate area, in one-tenth increments, under the wax that was picked free of coating.
↓
.1p5A bss5A—the paper body stock was split when the wax was pulled from the paper, i. e. the adhesive strength of the coating was greater than the strength of the fiber to fiber bond of the paper.
np5A—the coating under the wax was undisturbed.

Alternatively, if such a fine gradation of adhesive strength as indicated by the one-tenth increments above is not desired, the connotations vslp5A-very slight pick and slp5A-slight pick, may be used. The complete tabulation in such case would then be: cp5A, vslp5A, slp5A, bss5A, np5A. Thus with a given wax, the less the picking, the greater the adhesive strength of the coating.

Table I illustrates the effect of elevated extraction temperatures on the viscosity of coating solutions and the adhesive strength of the paper coatings made from such solutions. All extractions were made with a solution containing 1% sodium sulfite based on the weight of the flakes being extracted.

*Table I*

| Extraction temp., °F. | Coating color viscosity (cps.) | Wax test | |
|---|---|---|---|
| | | Wire | Felt |
| 110 | 298 | .8p5A | cp5A |
| 160 | 96 | np6A, .1p7A | np7A, bss8A |
| 190 | 306 | .6p8A, np8A | np7A, bss8A |

It may be seen from the above data that the extractions at high temperature produced a protein of greatly improved adhesive strength and that even a 190° F. extraction temperature under the conditions specified results in a solution viscosity only very slightly greater than the solution viscosity of protein extracted at 110° F.

*Example 2.*—The procedure of Example 1 was followed except that the extraction was carried out with a solution containing 2% sodium sulfite based on the weight of the flakes being extracted.

The results are shown in Table II.

Table II

| Extraction temp., °F. | Coating color viscosity (cps.) | Wax test | |
|---|---|---|---|
| | | Wire | Felt |
| 90 | 230 | cp5A | cp5A |
| 160 | 100 | np7A, .3p8A | np6A, bss7A |
| 190 | 272 | np8A, bss9A | np9A, bss10A |

Here again, a very marked increase in the adhesive strength of paper coatings prepared from protein extracted at high temperatures is apparent.

*Example 3.*—Sodium sulfite, 0.01 part by weight, was dissolved in 14 parts of water at about 110° F. To this solution was added one part by weight of substantially oil-free soybean flakes. The resulting slurry was agitated by a paddle at about 150 R. P. M. for about 30 minutes, the temperature being held within five degrees of 110° F., and then screened through a 100 mesh screen. The wet solids were then reslurried with about 0.9 times their weight of water at the temperature above noted, agitated for 10 to 15 minutes more, and also screened through a 100 mesh screen. The extracts from both extractions were combined and passed through a 200 mesh screen. One portion of the combined protein-containing extracts was then heated to the temperature indicated in Table III, and another portion was not heated. After this heat treatment, the heated extract was cooled by means of a water bath, to the temperature indicated in the table and the protein of each portion was precipitated by the addition of sulfur dioxide to a pH of about 4.4. The precipitated protein curd was then settled, washed, filtered and dried.

Re-solution of the protein, preparation of paper coating colors, and testing of the coated paper was accomplished as set forth in Example 1 above.

It may be seen from the above data that heating the protein-containing extract, after extraction at a relatively low temperature, results in a protein of greatly increased adhesive strength. Furthermore, contrary to the teachings of the prior art, the high temperatures involved in the process have substantially no effect upon the viscosity of coating colors prepared from protein resulting from such process.

*Example 4.*—Sodium sulfite, 0.01 part by weight, was dissolved in 22 parts of water at about 110° F. To this solution was added one part by weight of substantially oil-free soybean flakes. The resultant slurry was agitated for 30 minutes, screened through a 100 mesh screen and again through a 200 mesh screen, the temperature being held during the extraction procedure to within about five degrees of the above noted temperature. Protein was precipitated from the resulting solution by the addition of sulfur dioxide to 4.6 pH at 110° F., and the precipitated protein curd was then settled, washed, filtered and dried.

Re-solution of the protein, preparation of paper coating colors, and testing of the coated papers were accomplished as set forth in Example 1 above.

Two runs were made for comparison purposes. In one the extract was heated and then cooled before precipitation and in the other, the protein was precipitated without the intermediate heating. The conditions of operation and the results are shown in Table IV below.

Table IV

| Extraction temp., °F. | pH | Extract heated to— | Coating color viscosity (cps.) | Wetting [1] time | Wax test | |
|---|---|---|---|---|---|---|
| | | | | | Wire | Felt |
| 110 | 6.7 | Not heated | 250 | None in 5 min. | np4A, .3p5A | np4A, cp5A |
| 110 | 6.7 | 190° F. | 420 | ½ in 5 min. | np7A, bss8A | np7A, bss8A |

[1] Determined by the following method: A protein sample is ground to pass a 60 mesh screen. A 50 ml. beaker is filled about two-thirds full of distilled water and 1 gram of the screened protein is dropped onto the surface of the water from a height of about 1 inch. (The beaker must not be agitated or moved during the time of the test.)
(The amount of protein particles which are wet and have sunk in 5 minutes is recorded.)

Thus, it can be seen from the above data that heating the protein-containing extract after the extraction step greatly improves the adhesive strength of the protein and also improves the wettability while avoiding any great increase in coating color viscosity.

In both Examples 3 and 4, if desired, the extract may be held at the increased temperature up to about one hour without any adverse effects on the quality of the resulting protein.

*Example 5.*—A comparison of the yield and viscosity obtained from sodium sulfite extraction with that obtained from water extraction alone was made. The procedure of Example 1 was followed in preparing the protein except that the Table III

| Extraction temp., °F. | pH | Extract heated to— | Precipitation temp., °F. | Coating color viscosity (cps.) | Wax test | |
|---|---|---|---|---|---|---|
| | | | | | Wire | Felt |
| 110 | 6.7 | No heating | 100 | 298 | .85A, cp6A | cp5A |
| 110 | 6.7 | 160° F. | 110 | 302 | np6A, .3p7A | np6A, bss7A | extraction temperature was 175° F. and that sulfuric acid was used as the precipitating agent in all cases. The following data were obtained.

Table V

| Percent sodium sulfite | Percent yield | Coating color viscosity (cps.) |
| --- | --- | --- |
| None | 16.7 | gel |
| 1 | 31.8 | 190 |
| 2 | 32.2 | 190 |

Thus, extraction with sulfite gives approximately twice the yield obtained from water extraction alone and although all extractions were made at high temperature, the sulfite-extracted protein did not gel when made into a paper coating color.

*Example 6.*—A comparison of protein extracted by conventional alkaline extraction procedures, protein extracted with sulfite alone at high temperatures, and protein extracted at high temperatures with a mixture of sulfite and alkali was made.

The procedure of Example 1, including cooling of the extract before precipitation of the protein therefrom, was followed except that sulfuric acid was used to precipitate the protein from the extract. The conditions of extraction and the results obtained are indicated in the following table.

Table VI

| Extraction temp., °F. | pH | Alkali present | Sulfite present | Coating color viscosity (cps.) | Wax test Wire | Wax test Felt |
| --- | --- | --- | --- | --- | --- | --- |
| 90 | 9.0 | Yes [1] | No | 640 | np4A, cp6A | vslp5A |
| 160 | 6.7 | No | 1% | 70 | np5A | .2p6A |
| 160 | | Yes [2] | 1% | 90 | np7A | |

[1] Enough alkali was added to obtain the desired solution pH.
[2] The amount of alkali added here was the same as that added in the 90° F. extraction but the pH of the solution was not measured.

The above data clearly show that extraction of protein at high temperatures with sulfite present markedly lowers coating color viscosities and improves adhesive strength, and that in some cases further improved properties may be obtained by addition of alkali to the high temperature extraction.

*Example 7.*—A comparison of conventional alkali extracted protein with protein extracted at high temperature with solutions of calcium sulfite and potassium sulfite is given in Table VII below. Table VIII shows a comparison of the adhesive strength and coating color viscosity of protein extracted with sodium sulfite calcium sulfite and potassium sulfite. The procedure of Example 1, including cooling of the extract before precipitation of the protein therefrom, was followed in all cases except that sulfuric acid was used to precipitate the protein from the extract. The conditions of extraction are given in the table.

Table VII

| Extraction temp., °F. | pH | Sulfite used | Coating color viscosity (cps.) | Wax test Wire | Wax test Felt |
| --- | --- | --- | --- | --- | --- |
| 90 | 9.0 | None | 640 | np4A, cp6A | vslp5A |
| 160 | 6.7 | 2% CaSO₃ | 48 | np5A | bss6A |
| 160 | 6.7 | 2% K₂SO₃ | 75 | np5A | bss6A |

Table VIII

| Extraction temp., °F. | pH | Sulfite used | Coating color viscosity (cps.) | Wax test Wire | Wax test Felt |
| --- | --- | --- | --- | --- | --- |
| 160 | 6.7 | 1% Na₂SO₃ | 70 | np5A | .2p6A |
| 160 | 6.7 | 2% CaSO₃ | 48 | np5A | bss6A |
| 160 | 6.7 | 2% K₂SO₃ | 75 | np5A | bss6A |

Thus, the above data indicate that sulfites other than sodium sulfites are applicable in the present process with substantially equivalent results.

*Example 8.*—The effect of high temperature extraction on the wettability of dry ground protein prior to redispersion can be seen from the following data. The extraction procedure of Example 1 was followed in all cases. The extraction at 110° F. is to be considered the blank for the series of runs and the extracts from the high temperature extractions were cooled (as in Example 1) before the protein was precipitated therefrom. Wetting time was determined in accordance with the procedure in the footnote under Table IV.

Table IX

| Temp. used for extraction, °F. | pH during extraction | Wetting time [1] |
| --- | --- | --- |
| 110 | 6.7 | Not in 5 min. |
| 140 | 6.7 | 1½–2 min. |
| 160 | 6.7 | 1–1½ min. |

[1] The time recorded is that in which substantially all particles are wet and have sunk.

In any of the foregoing examples, a bisulfite or metabisulfite may be substituted for the particular sulfite specified and when I refer to "sulfite" in the specification or the appended claims I mean thereby normal sulfites, bisulfites and meta-bisulfites. Also, the various sulfites may be used in admixture if so desired.

Some advantages in improved color of the product may be obtained by using bisulfite or metabisulfite. However, because these reagents have an acid reaction, they tend to establish the pH of extraction nearer the isoelectric range of the protein, thus lowering the yield of protein. Depending on whether good yield or light color is most desired, any of the sulfites may be used, all of them giving the advantages of low viscosity and high adhesive strength when used in accordance with this invention.

Then too, the extraction solution may contain other reagents in addition to the alkali metal sulfite or alkaine earth metal sulfite, as for example a caustic alkali or some alkaline salt, such a combination being advantageous for certain purposes, although care should be exercised to adjust processing conditions so as to prevent substantial hydrolysis by solutions of high alkalinity. The following examples and Example 6 above, illustrate the advantage of high temperature treatment when a solution containing a mixture of sodium sulfite and caustic soda is used as the extracting agent.

*Example 9.—Run 1.*—Sodium sulfite, 0.01 part by wieght, was dissolved in 14 parts of water at 110° F. One part of solvent extracted substantially oil-free soybean flakes was added, followed by sufficient caustic soda to raise the pH to 8.5 and to maintain that pH over a 30 minute period, the time required for extraction. The undissolved portion of the flakes was separated from the extract by screening, washed with water at 110° F. and the washings were added to the extract. The protein was precipitated from the extract by the addition of dilute sulfuric acid to 4.5 pH. The precipitated protein curd was then settled, washed, filtered and dried.

Run 2.—Another portion of the flakes used in run 1 was treated in accordance with the procedure of Example 1, including the cooling of the extract before precipitation of the protein, the extraction temperature being 160° F. and the precipitating acid sulfur dioxide, except that alkali sufficient to raise the extraction pH to 8.5 was added to the sulfite solution containing the flakes.

Standard coating colors were prepared from the extracted dried protein of runs 1 and 2 above in accordance with the procedure set forth in Example 1 with the following results.

Table X

| Run | Extraction temp., °F. | Precipitating acid | Wax test | |
|---|---|---|---|---|
| | | | Wire | Felt |
| 1 | 110 | $H_2SO_4$ | cp4A | cp4A |
| 2 | 160 | $SO_2$ | np6A | np7A |

Thus it can be seen from the above data that the high extraction tmeperature greatly improves the adhesive strength when a solution containing a mixture of sodium sulfite and caustic soda is used as the extracting agent.

Example 10.—Two extractions of solvent extracted soybean flakes were made with water containing 1% sodium sulfite based on the weight of the flakes. The extractions were carried out at a pH of about 6.7 and a temperature of about 90° F., the procedure of Example 1 being followed up to the precipitation step.

One sample (run 1) was then precipitated to pH 4.6 with sulfuric acid and is designated as the "blank" in the following table.

The other sample (run 2) was given the following treatment: The extract was pumped through a copper coil placed in vigorously boiling water and then immediately through another copper coil immersed in an ice-water bath, the total elapsed time for the heating and cooling being about 15 seconds. (Preliminary testing indicated that the extract was heated to about 165° F. in passage through the hot coil.) The temperature of the effluent from the cold coil was 80° F. After this treatment the protein was precipitated from the extract with sulfuric acid to 4.6 pH.

Both samples were then settled, washed, decanted and filtered and re-solution of the protein, preparation of coating colors, and testing of the coated paper was accomplished as set forth in Example 1 above.

Table XII

| Run | Coating color viscosity (cps.) | Wax test | |
|---|---|---|---|
| | | Wire | Felt |
| 1 (blank) | 600 | .1p3A | .2p3A |
| 2 | 520 | np4A | np5A |

The actual time at which the extract is at the elevated tmeperature is not known but it is considerably less than the 15 seconds complete cycle time indicated above. Thus, it can readily be seen that the advantages of the invention may be realized even if the extract is quickly heated and then quickly cooled before precipitation of the protein therefrom.

Example 11.—Two extractions of peanut meal at a meal to water ratio of 1 to 20 were made for comparison purposes. The conditions of extraction and the results are set forth in Table XII below. In both runs, the extraction slurry was screened through a 100 mesh screen and then screened again through a 200 mesh screen before the protein was precipitated with sulfuric acid at about 4.5 pH.

Coating colors were made up in accordance with the procedure set forth in Example 1.

Table XIII

| Extraction temp., °F. | pH | Sulfite used | Precipitation temp., °F. | Coating color viscosity (cps.) | Wax test | |
|---|---|---|---|---|---|---|
| | | | | | Wire | Felt |
| 90 | 9 | None | 90 | 37 | np5A | np4A |
| 160 | 7.2 | 1% | 105 | 36.5 | np6A | np5A |

It can be seen from the above that protein extracted from peanut meal at high temperature in the presence of sulfite shows an advantage in adhesive strength, with no disadvantage in coating color viscosity, over protein extracted at low temperature in the absence of sulfite.

Having thus described my invention, what I claim is:

1. In the process of preparing a substantially unhydrolyzed protein, which process comprises extracting the protein from a substantially oil-free proteinaceous seed material with an aqueous sulfite-containing solution, separating the protein-containing solution from insoluble residue and precipitating the protein from said solution, the steps of subjecting the solution containing extracted protein to a temperature within the range from about 150° to about 212° F. at any time prior to precipitation of the protein, and cooling the protein-containing solution to a temperature not substantially in excess of 120° F. before precipitating the protein therefrom.

2. In the process of preparing a substantially unhydrolyzed protein, which process comprises extracting the protein from a substantially oil-free proteinaceous seed material with an aqueous sulfite-containing solution, separating the protein-containing solution from insoluble residue and precipitating the protein from said solution, the steps of extracting the protein with the aqueous sulfite-containing solution at a temperature in the range from about 150° F. to about 212° F. and cooling the protein-containing solution to a temperature not substantially in excess of 120° F. before precipitating the protein therefrom.

3. In the process of preparing a substantially unhydrolyzed protein, which process comprises extracting the proteins from a substantially oil-free proteinaceous seed material with an aqueous sulfite-containing solution, separating the protein-containing solution from insoluble residue and precipitating the protein from the said solution, the steps of extracting the protein with the aqueous sulfite-containing solution at a temperature not in excess of 120° F., heating the protein-containing solution subsequent to separation of the insoluble matter therefrom, to a temperature within the range from about 150° F. to about 212° F. and cooling the said solution to a temperature not in excess of 120° F. before precipitating the protein therefrom.

4. The process of claim 3 wherein the heated extract is held at a temperature within the range from about 150° F. to about 212° F. for a period not substantially in excess of one hour but sufficient to effect material increase in the adhesive strength of the protein without adversely affecting the vicosity of coating colors prepared from said protein.

5. In the process of preparing an isolated soybean protein suitable for use in paper coating which process comprises extracting the proteins from substantially oil-free soybean flakes with an aqueous sulfite-containing solution, separating the protein-containing solution from insoluble residue, precipitating the proteins from said solution and concentrating and dewatering the precipitated protein, the steps of extracting the protein with the aqueous sulfite-containing solution at a temperature in the range from about 160° F. to about 180° F. and, subsequent to the separation of the insoluble matter from the resultant protein-containing solution, precipitating the protein from the said solution by the addition of sulfur dioxide at a temperature below about 120° F. and above the freezing temperature of the solution.

6. In the process of isolating soybean protein which process comprises extracting the protein from a substantially oil-free soybean flakes with an aqueous sulfite-containing solution, separating the protein-containing solution from insoluble residue, precipitating the protein from said solution and concentrating and dewatering the precipitated protein, the steps of extracting the protein at a temperature not in excess of about 120° F., heating the protein-containing solution, subsequent to separation of the insoluble matter therefrom, to a temperature in the range from about 160° F. to about 180° F., and precipitating the protein from said solution by the addition of sulfur dioxide at a temperature below about 120° F. and above the freezing temperature of said solution.

STEWART ROWE.

References Cited in the file of this patent

UNITED STATES PATENTS

| Number | Name | Date |
| --- | --- | --- |
| 2,451,659 | Calvert | Oct. 19, 1948 |
| 2,462,933 | Arthur et al. | Mar. 1, 1949 |
| 2,479,040 | Davidson | Aug. 16, 1949 |
| 2,529,477 | Arthur | Nov. 14, 1950 |

OTHER REFERENCES

Arthur et al., J. Am. Oil Chem. Soc., pp. 398–400, vol. 25, Nov. 1948.

Beckel et al., Ind. and Eng. Chem., pp. 973–6, vol. 34, No. 8.